United States Patent Office 3,336,233
Patented Aug. 15, 1967

3,336,233
BUILT DETERGENT COMPOSITIONS CONTAINING 3-HYDROXYALKYL ALKYL SULFOXIDES
Warren I. Lyness, Mount Healthy, and David E. O'Connor, Cincinnati, Ohio, assignors to The Procter & Gamble Company, Cincinnati, Ohio, a corporation of Ohio
No Drawing. Original application Mar. 30, 1965, Ser. No. 448,228, now Patent No. 3,288,859, dated Nov. 29, 1966. Divided and this application Sept. 12, 1966, Ser. No. 578,456
4 Claims. (Cl. 252—161)

ABSTRACT OF THE DISCLOSURE

Detergent compositions containing 0.5% to 90% 3-hydroxy-alkyl alkyl sulfoxide detergent and 10% to 90% water soluble alkaline detergency builders and the process of laundering fabric in cool water with said compositions.

---

This application is a division of the copending application of Warren I. Lyness and David E. O'Connor, Ser. No. 448,228, filed Mar. 30, 1965, now U.S. Patent 3,288,859.

This invention relates to sulfoxide compounds containing hydroxy groups, especially those compounds containing hydroxy groups in the gamma position, and to methods for synthesizing said compounds.

Compounds containing both a sulfoxide group and a gamma hydroxy group are very useful surface active agents. Heretofore it has been essentially impossible to prepare compounds containing both groups wherein the hydroxy group is in the gamma position.

Most of the difficulties encountered in preparing a compound containing both hydroxy and sulfoxide groups are a result of the sulfoxide group. Normally sulfoxides are prepared by oxidizing the corresponding sulfide, however, this oxidation method is not desirable since the oxidation method normally produces a mixture of compounds containing some unreacted sulfides and/or some sulfone by-products which are generally undesirable. It is difficult or impossible to separate the sulfides and sulfones from the desired sulfoxides especially when a hydroxy group is present in the molecule.

It can be appreciated therefore that an effective method for introducing a sulfoxide group and e.g., a gamma hydroxy group into the same compound is desirable. It can equally be appreciated that a method which permits the formation of compounds containing both hydroxy and sulfoxide groups without the use of high temperatures, corrosive oxidizing agents and specialized equipment is very desirable.

Accordingly, it is an object of this invention to prepare compounds containing both a sulfoxide group and a hydroxy group, e.g., a hydroxy group in the gamma position (hereinafter referred to as hydroxy sulfoxides), by methods which avoid the aforesaid defects.

It is a more specific object of this invention to provide new hydroxy sulfoxides having superior surface active properties.

It is a yet further object of this invention to provide detergent compositions containing hydroxy sulfoxide detergents of this invention.

REACTION BETWEEN ALKALI METAL SALTS OF SULFINYL CARBANIONS AND EPOXY COMPOUNDS

The objects of this invention can be accomplished by reacting (A) salts of sulfinyl carbanions having the formula $$R-\overset{O}{\underset{\uparrow}{S}}-\overset{R^1}{\underset{R^2}{C}}{}^{\ominus}M^{\oplus}$$

wherein R is a hydrocarbon group containing from 1 to about 30 carbon atoms, and wherein R is attached to the sulfur atom of the sulfoxide group by a single covalent bond between carbon and sulfur, wherein $R^1$ and $R^2$ are selected from the group consisting of hydrogen and hydrocarbon groups containing from about 1 to about 30 carbon atoms, and wherein R, $R^1$ and $R^2$ each contain from 0 to about 10 linkages selected from the group consisting of ether, thioether and imino linkages, and from 0 to about 5 amine groups each selected from the group consisting of primary, secondary and tertiary amine groups, and are not more reactive with a strong base than a hydrogen atom attached to a saturated carbon atom adjacent to the sulfoxide group and wherein the total number of carbon atoms in the sulfoxide compound does not exceed about 32, and not more than two of the hydrocarbon groups in the compound contain aryl groups, and wherein M is an alkali metal, with (B) a compound having the formula $$R^3-\underset{H}{C}\overset{O}{\underset{}{\diagup\diagdown}}\underset{H}{C}-R^4$$

wherein $R^3$ and $R^4$ are each selected from the group consisting of hydrogen, aryl hydrocarbon groups, alkyl aryl hydrocarbon groups, alkyl hydrocarbon groups, and aliphatic ring hydrocarbon groups, said groups containing from 1 to about 30 carbon atoms and from 0 to about 10 linkages selected from the group consisting of ether and thioether linkages, the reaction being carried out at a temperature of from about 0° C. to about 100° C.

R, $R^1$, $R^2$, $R^3$ and $R^4$ have the above definitions wherever they appear herein. A more complete discussion of these groups appears hereinafter.

The above reaction proceeds as follows:

Equation 1

$$R^3-\underset{H}{C}\overset{O}{\diagup\diagdown}\underset{H}{C}-R^4 + M^{\oplus\ominus}\underset{R^2}{\overset{R^1}{C}}-SO-R \longrightarrow R^3-\underset{H}{\overset{\overset{M^{\oplus}}{\underset{\ominus}{O}}}{C}}-\underset{R^4}{\overset{H}{C}}-\underset{R^2}{\overset{R^1}{C}}-SO-R$$

The new ion which is the product of this reaction will undergo many reactions. For instance, the ion will react with water or compounds containing an active hydrogen to add a hydrogen atom to the alkoxide ion and give the hydroxy sulfoxides of this invention. These 3-hydroxy alkyl alkyl sulfoxides are the gamma hydroxy sulfoxides of this invention as hereinafter more fully described.

The reaction of this new ion with compounds containing an active hydrogen atom such as water, certain alcohols, acids, etc., is as follows:

Equation 2

$$HZ + R^3-\underset{H}{\overset{\overset{M^{\oplus}}{\underset{\ominus}{O}}}{C}}-\underset{R^4}{\overset{H}{C}}-\underset{R^2}{\overset{R^1}{C}}-SO-R \longrightarrow R^3-\underset{H}{\overset{OH}{C}}-\underset{R^4}{\overset{H}{C}}-\underset{R^2}{\overset{R^1}{C}}-SO-R + MZ$$

Z in the above reaction can be, e.g., a hydroxy group, certain alkoxy groups, chloride, bisulfate, acetate, etc., as hereinafter described.

The new ion which is the product of Equation 1 can also react with further amounts of epoxide (either the same epoxide used to form the ion, or a different one, or ones), and this new reaction product will undergo the same reactions as the first ion, including hydrolysis to yield a hydroxy sulfoxide containing one or more ether linkages. For example, when an alkali metal salt of an alkyl sulfinyl carbanion such as dodecyl sulfinyl carbanion is reacted with Q moles of an epoxy compound, such as ethylene oxide, per mole of carbanion wherein Q is an integer of from 1 to about 50, and the resulting product is reacted with a compound having an active hydrogen atom, the following is an example of the resulting product:

$$C_{12}H_{25}SOCH_2(CH_2CH_2O)_QH$$

These compounds, for example, 1-tridecylsulfinyl-4,7-dioxa-9-hydroxynonane, are surface active agents when they contain a sufficiently long hydrophobic group and can be used in the formation of surface active agents, when they do not contain a sufficiently long hydrophobic group, by adding an appropriate hydrophobic group.

The symbol used for the sulfoxide groups

is only a convenient representation of the structure for purposes of the description of the invention and is not necessarily indicative of the actual structure which is believed to involve a semi-polar bond. This symbol or even more simply (—SO—) is used hereinbefore and hereinafter to represent the sulfoxide group.

As used herein, the term "hydrocarbon groups" refers to both unsubstituted hydrocarbon groups and substituted hydrocarbon groups containing, for example, ether linkages. Preferably the substituent hydrocarbon groups (R) in the formulas above and below are alkyl chains, straight or branched, containing from 1 to about 22 carbon atoms (e.g, methyl, ethyl, n-propyl, isopropyl, n-butyl, isobutyl, n-pentyl, isopentyl, n-hexyl, n-heptyl, n-octyl, isooctyl, 2-ethylhexyl, diisobutyl, n-nonyl, tripropylene, n-decyl, undecyl, n-dodecyl, tridecyl, n-tetradecyl, pentadecyl, n-hexadecyl, n-octadecyl, eicosyl, docosyl, vinyl, propenyl, octenyl, 10-undecenyl, 9-octadecenyl, cyclopentyl, cyclohexyl, cyclohexylmethyl, methylcyclohexyl, 2-cyclohexyldodecyl, 12-cyclohexyldodecyl, 4-dodecylcyclohexyl and propynyl). Examples of other groups include aryl groups containing 6 to 12 carbon atoms (e.g., phenyl, biphenyl and naphthyl); and alkyl aryl groups containing benzene or napthtalene groups with branched or straight alkyl chains of from 1 to about 18 carbon atoms (e.g., benzyl, 2-phenyl-dodecyl, 1-methyl-2-phenylethyl, 2-indenyl and naphthylmethyl). $R^1$, $R^2$, $R^3$ and $R^4$ are each selected from the group consisting of hydrogen and hydrocarbon groups which are the same as those examples given hereinbefore with respect to R. The presence of certain non-reactive groups in or on the substituent R, $R^1$, $R^2$, $R^3$ or $R^4$ groups is permissible. As an example of non-reactive groups, these substituent groups can contain up to about 10 ether and/or thioether linkages. Up to five amino groups can be appended to the chain or up to ten imino

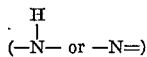

groups can form a part of the chain with open chain and/or cyclic configuration. (R, $R^1$ and $R^2$, have the above definitions throughout the specification and claims.) Thus, R, $R^1$, $R^2$, $R^3$ or $R^4$ can represent, for example, such groups as 3,6,9,12,15 - pentathiaheptacosanyl; 3,6,9,12,15-pentaoxaheptacosanyl; 3,6,9-trithiaheptacosanyl; 3,6,9-trioxaheptacosanyl; 2-dodecyloxyethyl; 2-octadecyloxyethyl; 2-methoxyethyl; 2-ethoxyethyl; 2-hexyloxyethyl; 2-octyloxyethyl; 2-dodecylthioethyl; 2-octadecylthioethyl; 2-methylthioethyl; 2-ethylthioethyl; 2-hexylthioethyl; 2-octylthio- ethyl; 11-methoxyundecyl; 11-methylthioundecyl; 11-ethoxyundecyl; 9- or 10-methoxyoctadecyl; 9- or 10-ethoxyoctadecyl; 9- or 10-methylthiooctadecyl; 2-, 3-, or 4-methoxycyclohexyl; 3- or 4-methylthiocyclohexyl; 3-cyclohexyloxydecyl; 2,5,8,11,14-pentamethyl-3,6,9,12,15-pentaoxaheneicosanyl; 2-tetrahydrofuranyl; 2-tetrahydrothiophenyl; tetrahydropyranyl; 2-(tetrahydropyranyl)-ethyl; 2-(2-tetrahydrofuranyl)-ethyl; tetrahydrothiofuranyl; 3,6-dioxaheptyl; 3,6-dithiaheptyl; 3,6,9-triazaheneicosanyl; β-aminoethyl; β-aminopropyl; β-methylaminoethyl; β-methylaminopropyl; β-dimethylaminoethyl; β-dimethylaminopropyl; 5-amino-3-azapentyl; 5-dimethylamino-3-azapentyl; 5 - dimethylamino - 3-methazapentyl; 8-amino-3,6-diazaoctyl; 15 - amino - 3,6,9,12-tetrazapentadecyl; 4,6-dimethoxy-2-sym-triazinyl; 4,6-diamino-2-sym-triazinyl; 4-piperidyl; β-(N-piperidyl)-ethyl; β-(N-piperazinyl)-ethyl; β-(N-imidazolyl)-ethyl; β-(N-morpholino)-ethyl; β-(N-oxazolyl)-ethyl; β-(N-pyrrolidyl)-ethyl; and 2-thiazolyl. Additionally, R can represent, for example, β-N-anilinoethyl; β-N-anilinopropyl; β-N-pyridylethyl; 1-methoxy-2-indanyl; β-N-naphthylaminoethyl; 2-benzoxazolyl and 4,6-dianilino-2-sym-triazinyl.

It will be understood that more than one sulfinyl carbanion group can be present in the molecule of component (A). This is to say there can be more than one

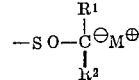

Preferably $R^1$ and $R^2$ in these additional groups are hydrogen atoms. The two sulfinyl carbanion groups should be separated by at least three aliphatic carbon atoms, but can be attached to adjacent carbon atoms on a benzene ring. Polymers containing multiple pendant alkali metal sulfinyl carbanion groups are desirable as reactants. The restriction on the number of carbon atoms which can be present in the molecule is, of course, different when more alkali metal sulfinyl carbanion groups are present. The number of carbon atoms per alkali metal sulfinyl carbanion group should not exceed 32, however.

The preferred reactants are the alkali metal salts of methylsulfinylcarbanion such as sodium or potassium salts because these salts undergo the aforementioned reactions with remarkable facility. Another especially preferred group of reactants are those wherein the R group contains from 2 to about 22 carbon atoms and $R^1$ and $R^2$ are hydrogen atoms.

Compounds which contain an epoxy linkage and are especially suitable for reaction with the sulfinyl carbanion or alkanesulfenates as hereinafter described are those in which $R^3$ and $R^4$ are each either hydrogen or an alkyl (either straight or branched chain, saturated or unsaturated), aryl, alkyl aryl, or aliphatic ring hydrocarbon compounds containing from 1 to about 30 carbon atoms. $R^3$ can be attached to $R^4$. $R^3$ and $R^4$ can contain from 0 to 5 ether and/or thioether linkages without substantially affecting the essential reaction as hereinbefore described. It will be understood that $R^3$ and $R^4$ are interchangeable in the formulas given herein. Preferably, $R^4$ is a hydrogen atom. ($R^3$ and $R^4$ have the above respective definitions throughout the specification and claims, except where otherwise specifically indicated.)

Epoxide reactants which are especially useful include dodecylene oxide; ethylene oxide; propylene oxide; octyl, decyl, dodecyl, tetradecyl, hexadecyl and octadecyl glycidyl ethers; hexadecylene oxide; octadecylene oxide; butylhexene oxide; p-methyl styrene oxide, or mixtures of two or more of these epoxides.

Of particular interest are reactions between mixtures of epoxides derived from mixtures of alpha olefins and a sulfinyl carbanion. In a preferred epoxide reactant, $R^3$ has from about 6 to about 18 carbon atoms and $R^4$ is a hydrogen atom. In another preferred epoxide reactant, $R^3$ has the formula

wherein $R^5$ is an alkyl chain containing from 6 to about 18 carbon atoms, and $R^4$ is a hydrogen atom. ($R^5$ has this definition throughout the specification and claims, except where otherwise specifically indicated.) When these epoxide compounds are reacted with alkali metal salts of methylsulfinylcarbanion excellent detergent surfactants are prepared.

Dimethyl sulfoxide is an excellent solvent for the reactions of this invention and in most instances an excess of dimethyl sulfoxide is the preferred solvent. However, other non-reactive solvents or diluents can be used, especially other sulfoxide compounds. These solvents preferably should not contain any reactive constituent either as part of the structure of the solvent or as part of impurities present in the solvent if maximum yields are desired. The use of solvents which will react with the salts of the carbanion is generally undesirable. It is recognized, however, that certain reactive compounds can be present as a solvent or as a component of a solvent mixture to yield an in situ formation and reaction of the salts of sulfinyl carbanions.

Suitable non-reactive solvents or diluents for the above reactions of salts of sulfinyl carbanions and epoxy compounds and for alkali metal alkanesulfenates and epoxy compounds as hereinafter more fully described are to be found in such classes of compounds as the aliphatic or aromatic hydrocarbons, aliphatic, aromatic or mixed aliphatic-aromatic ethers, cyclic ethers and amines. Examples of suitable non-reactive hydrocarbon solvents include hexane, petroleum ether, "Stoddard" solvent, benzene, toluene and mixed xylenes. Among the ether compounds which are suitable as solvents are diethyl ether, dibutyl ether, anisole, diphenyl ether, tetrahydrofuran, 1,2-dimethoxyethane and diethylene glycol dimethyl ether. Amine compounds which can serve as solvents for the reactions of this invention include butylamine, N-methyl butylamine, anhydrous ethylene diamine, pyridine and morpholine. Anhydrous liquid ammonia can also be used as a solvent. Still another compound which is suitable is N,N-dimethyl formamide. Other similar non-reactive solvents or diluents can be used with substantially equivalent results.

The rate and course of the above reactions can be affected by the choice of solvent. The use of mixtures of two or more non-reactive compounds as the reaction medium is, of course, suitable and in some cases preferable to the use of a single species.

The reactions of this invention are normally carried out at slightly above room temperature (25° C.); temperatures of about 50° C. to about 70° C. are preferred.

Carbon metal bonds are unstable at elevated temperatures and at 120° C., for instance, sodium methylsulfinylcarbanion is destroyed. Therefore, elevated temperatures above the decomposition temperature of the carbanion are undesirable. Lower temperatures than room temperature are not normally desirable because the speed of the reaction is undesirably decreased. A temperature range of from about 0° C. to about 100° C. is suitable for carrying out the reactions of this invention.

Sodium and potassium salts of the sulfinyl carbanions and mixtures thereof are preferred for stability and cost considerations.

REACTION BETWEEN ALKALI METAL ALKANE-SULFENATES AND EPOXY COMPOUNDS

Alkali metal alkanesulfenates having the formula

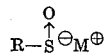

wherein R is a hydrocarbon group containing from about 1 to about 30 carbon atoms, wherein R is attached to the sulfur atom of the sulfoxide group by a single covalent bond between carbon and sulfur, wherein R contains from 0 to about 10 linkages selected from the group consisting of ether, thioether and imino linkages, and from 0 to about 5 amine groups each selected from the group consisting of primary, secondary and tertiary amine groups, and wherein M is an alkali metal, can also be reacted with the epoxy compounds hereinbefore described. The reaction is essentially the same as with the alkali metal salts of sulfinyl carbanions, and the choice of solvents and temperature ranges is the same. The only difference is that the product contains one less $CH_2$ group between the sulfinyl group and the carbon bearing the alkoxide ion group. The hydrolysis of the product of this reaction is therefore a beta-hydroxy sulfoxide.

In some preparatory reactions the alkali metal alkanesulfenates are conveniently obtained in admixture with alkali metal sulfinyl carbanions, as more fully described in the copending application of Warren I. Lyness, David E. O'Connor and Jim S. Berry, Ser. No. 448,229. When such a mixture is reacted with from 1 to about 50 moles of an epoxy compound as hereinbefore described and subsequently hydrolyzed, a pair of homologous hydroxy sulfoxides results. One of these hydroxy sulfoxides, i.e., the beta-hydroxy sulfoxide, is formed from the alkali metal alkanesulfenate while the other, i.e., the gamma-hydroxy sulfoxide, is formed from the alkali metal sulfinyl carbanion. These mixtures of homologous sulfoxides are preferably used without separation as surface active agents or as intermediates in the preparation of surface active components.

It is possible, however, to preferentially react the carbanion from said mixture of alkali metal alklysulfinyl-carbanions and alkali metal alkanesulfenates first with a stoichiometric amount of a t-alkyl halide, water, sodium bisulfate, ethanol, acetone, acetic acid or any compound which is more acidic than dimethyl sulfoxide to leave essentially only alkanesulfenate ions which can then be reacted, e.g., according to the above reaction with epoxy compounds. For example, the reaction of potassium metal with dimethyl sulfoxide, destruction of the methylsulfinyl-carbanion with t-butyl bromide, and subsequent reaction of the alkanesulfenate ion with dodecene-1-oxide is as follows:

(1)
$$2CH_3-\overset{O}{\underset{\uparrow}{S}}-CH_3 + 2K \longrightarrow CH_3-SO-CH_2^{\ominus}K^{\oplus} + CH_3-SO^{\ominus}K^{\oplus} + CH_4$$

(2)
$$CH_3-SO-CH_2^{\ominus}K^{\oplus} + (CH_3)_3CBr \longrightarrow CH_3-SO-CH_3 + (CH_3)_2C=CH_2 + KBr$$

(3)
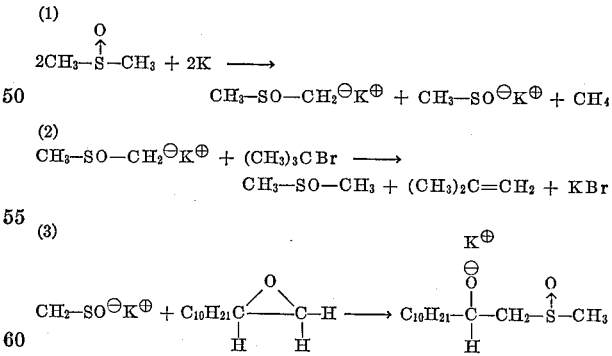

Reaction 2 is an example of an elimination reaction which can occur when an alkyl halide wherein the halogen atom is not attached to a primary carbon atom is reacted with an alkylsulfinylcarbanion salt. The product of reaction 3 will undergo the same reactions as the product of the reaction of alkali metal alkylsulfinylcarbanion and epoxy compounds.

The sodium and potassium methanesulfenates and mixtures thereof are preferred reactants.

THE COMPOUNDS OF THIS INVENTION

The reactions hereinbefore described give the following intermediate products and final products.

A. *Intermediate products.*—The intermediate compounds of this invention are compounds having the formula

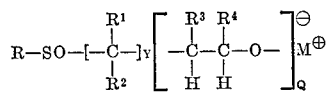

wherein R is a hydrocarbon group containing from 1 to about 30 carbon atoms, and wherein R is attached to the sulfur atom of the sulfoxide group by a single covalent bond between carbon and sulfur, wherein $R^1$ and $R^2$ are selected from the group consisting of hydrogen and hydrocarbon groups containing from about 1 to about 30 carbon atoms, and wherein R, $R^1$ and $R^2$ each contain from 0 to about 10 linkages selected from the group consisting of ether, thioether and imino linkages, and from 0 to about 5 amine groups each selected from the group consisting of primary, secondary and tertiary amine groups, and are not more reactive with a strong base than a hydrogen atom attached to a saturated carbon atom adjacent to the sulfoxide group and wherein $R^3$ and $R^4$ are each selected from the group consisting of hydrogen, aryl hydrocarbon groups, alkyl aryl hydrocarbon groups, alkyl hydrocarbon groups, and aliphatic ring hydrocarbon groups, said groups containing from 1 to about 30 carbon atoms and from 0 to about 10 linkages selected from the group consisting of ether and thioether linkages, and not more than two of the hydrocarbon groups in the compound contain aryl groups, and wherein Q is an integer from 1 to about 50 and wherein Y is selected from the group consisting of 0 and 1, and wherein M is an alkali metal.

Y is 0 in the above equation when the alkali metal alkanesulfenates are reacted with the epoxy compounds and 1 when the alkali metal salts of sulfinyl carbanions are reacted with the epoxy compounds. Q varies in the above formula depending upon the number of moles of epoxy compounds, of the same or different structures, that are reacted with the aforementioned salts of sulfinyl carbanions and alkanesulfenate. Preferred $R^1$, $R^2$, $R^3$ and $R^4$ groups in the above intermediate compounds are the preferred groups hereinbefore and hereinafter described with respect to the processes and 3-hydroxyalkyl alkyl sulfoxides of this invention.

When mixtures of alkali metal alkanesulfenates and alkylsulfinylcarbanion salts as hereinbefore described are reacted with epoxy compounds, the product is a mixture of the intermediate compounds wherein Y is 0 and 1. By selecting the amount of alkanesulfenate to be destroyed prior to the reaction with the epoxy compounds, mixtures of intermediate compounds containing from about 50 molar percent to 100 molar percent of the intermediate compounds wherein Y is 0 can be prepared.

HYDROXYALKYL ALKYL SULFOXIDES

The hydroxyalkyl alkyl sulfoxides of this invention have the general formula

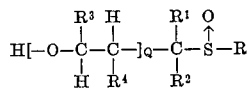

wherein R, $R^1$, $R^2$, $R^3$ and $R^4$, are the groups hereinbefore described and wherein Q is an integer of from 1 to about 50.

The hydroxyalkyl alkyl sulfoxides are useful as surface active agents when one of the R groups is of sufficient length to provide a hydrocarbon chain of from about 8 to about 18 carbon atoms. Those hydroxy sulfoxides which are not of themselves surface active can be used as intermediates in the preparation of surface active components.

Preferred compounds having detergent properties and which are suitable for use in the detergent compositions hereinafter described in detail are those compounds in which $R^3$ contains from 8 to about 18 carbon atoms; $R^1$, $R^2$ and $R^4$, are hydrogens; and R is a methyl group.

Other preferred compounds having detergent properties and which are suitable for use in the detergent compositions hereinafter described in detail are those in which $R^3$ has the formula

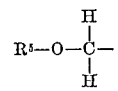

as hereinbefore described; R is a methyl group; and $R^1$, $R^2$ and $R^4$, are hydrogen atoms.

Examples of intermediates useful in the preparation of surface active agents include compounds where R is a short alkyl group of from 1 to about 3 carbon atoms, and $R^1$, $R^2$, $R^3$ and $R^4$, are either hydrogen or short alkyl chains of from 1 to about 3 carbon atoms. These intermediates can be reacted with, for example, long chain ($C_8$–$C_{18}$) epoxides or long chain ($C_8$–$C_{18}$) alkyl halides to form surface active agents.

Examples of the preceding hydroxy compounds useful as intermediates are:

3-hydroxypropyl methyl sulfoxide
3-hydroxyhexyl methyl sulfoxide
3-hydroxy-4-methoxybutyl methyl sulfoxide Examples of detergent compounds are:

3-hydroxytridecyl methyl sulfoxide
3-hydroxypentadecyl methyl sulfoxide
3-hydroxyundecyl methyl sulfoxide
3-hydroxy-4-octadecoxybutyl methyl sulfoxide
3-hydroxy-4-dodecoxybutyl methyl sulfoxide
3-hydroxy-4-octoxybutyl methyl sulfoxide
3-hydroxy-4-octaoxybutyl methyl sulfoxide

SURFACE ACTIVE AGENTS AND DETERGENT COMPOSITIONS

The novel gamma hydroxy sulfoxides are useful per se as detergent and surface active compounds or as intermediates in the preparation of detergent and surface active compounds.

The uses to which surface active compounds can be put are numerous and well known, e.g., preparing oil-in-water emulsions, textile treatment, dyeing, flotation, preparation of rubber latex, and the like.

The 3-hydroxyalkyl alkyl sulfoxides which are detergent materials (i.e., contain a hydrophobic chain of the desired length) as, for example, 3-hydroxytridecyl methyl sulfoxide, have been found to have excellent mildness to the skin as demonstrated hereinafter in Example XII. Therefore, these materials can be used to advantage in the formulation of personal use toilet bars and liquid detergent formulations for dishwashing. The 3-hydroxyalkyl alkyl sulfoxides may either serve as the sole surface active agent in such formulations or may be used in admixture with other anionic, cationic or nonionic surface active agents. The 3-hydroxyalkyl alkyl sulfoxides, when added in relatively small quantities, e.g., from about 0.5% to about 20%, to anionic surfactants in such formulations produce improved sudsing in dishwashing formulations and improved lathering in toilet bars.

It has also been discovered, for example, that the 3-hydroxytridecyl methyl sulfoxide is an effective dispersant for calcium soap curd as shown in Example XIII. Accordingly, formulations comprising 3-hydroxyalkyl alkyl sulfoxide detergents and soluble soap are particularly valuable. The formulations can be in the form of a bar, particulate form, etc., wherein the sulfoxide material constitutes, for example, from about 0.5% to about 90% by weight of the formula.

As demonstrated hereinafter in Examples IX–XI, the 3-hydroxyalkyl methyl sulfoxide detergents of this invention are excellent detergents in cool water, e.g., water having a temperature of from about 60° F. to about 90° F. These detergents are also excellent components of hard surface cleaning compositions, as shown in Example XIV.

The detergent compositions of this invention contain from about 0.5% to about 90% of a material having the formula:

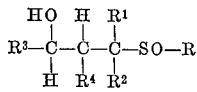

wherein at least one of the group R, $R^1$, $R^2$, $R^3$ and $R^4$ is an alkyl group containing from about 8 to about 18 carbon atoms and from 0 to about 10 ether linkages, the remaining groups being selected from the group consisting of hydrogen and alkyl groups containing from 1 to about 18 carbon atoms, the total number of carbon atoms in the molecule being from about 12 to about 32 carbon atoms.

Desirably, but not necessarily, the gamma hydroxy sulfoxides are used with alkaline builder materials to form built detergent compositions, as for example, liquid, bar, flake, granular or tabletted granular compositions. Such compositions have enhanced detergent characteristics due to coaction in aqueous washing compositions between the hydroxy sulfoxides and the alkaline builder material.

The compositions of this invention contain from 0% to 90%, preferably from about 10% to about 90% of water soluble alkaline detergency builder salts, either of the organic or inorganic types, and should provide a washing solution pH of about 9 to about 12. The ratio of builder salts to organic detergent is preferably from about 1:4 to about 20:1. Examples of water soluble inorganic alkaline detergency builder salts are alkali metal carbonates, phosphates, polyphosphates, and silicates. Specific examples of such salts are sodium and potassium tripolyphosphates, carbonates, pyrophosphates, orthophosphates and hexametaphosphates. Examples of organic alkaline detergency builder salts are (1) alkali metal amino polycarboxylates [e.g., sodium and potassium ethylenediaminetetraacetates, N-(2 - hydroxyethyl) - ethylenediaminetriacetates, nitrilo triacetates, and N-(2-hydroxyethyl)-nitrilo diacetates]; (2) alkali metal salts of phytic acid (e.g., sodium and potassium phytates—see U.S. Patent 2,739,942; (3) water soluble salts of ethane-1-hydroxy-1,1-diphosphonate (e.g., the trisodium and tripotassium salts—see U.S. Patent 3,159,581); (4) water soluble salts of methylene diphosphonic acid (e.g., trisodium and tripotassium methylene diphosphonate and the other salts described in U.S. Patent 3,213,030; (5) water soluble salts of substituted methylene diphosphonic acids (e.g., trisodium and tripotassium ethylidene, isopropylidene, benzylmethylidene, and halomethylidene diphosphonates and the other substituted methylene diphosphonates disclosed in the copending application of Clarence H. Roy, Ser. No. 266,055, filed Mar. 18, 1963); (6) water soluble salts of polycarboxylate polymers and copolymers as described in the copending application of Francis L. Diehl, Ser. No. 269,359, filed Apr. 1, 1963 (e.g., polymers of itaconic acid, aconitic acid; maleic acid; mesaconic acid; fumaric acid; methylene malonic acid; and citronic acid and copolymers with themselves and other compatible monomers such as ethylene); and (1) mixtures thereof.

Mixtures of organic and/or inorganic builders can be used and are generally desirable. Especially preferred are the mixtures of builders disclosed in the copending application of Burton H. Gedge, Ser. No. 398,705, filed Sept. 23, 1964 (e.g., ternary mixtures of sodium tripolyphosphate, sodium nitrilotriacetate, and trisodium ethane-1-hydroxy-1,1-diphosphonate).

The detergent compositions of this invention can contain any of the usual adjuvants, diluents and additives, for example, anionic, nonionic, ampholytic, cationic or zwitterionic detergents, perfumes, anti-tarnishing agents, anti-redeposition agents, bacteriostatic agents, dyes, fluorescers, suds builders, suds depressors, and the like, without detracting from the advantageous properties of the composition. Examples of anionic detergents are sodium coconut soap, sodium dodecylbenzene sulfonate and potassium tallow alkyl sulfate. Examples of nonionic detergents are dodecyldimethylamine oxide and the condensation product of coconut fatty alcohol with 5.5 moles of ethylene oxide. An example of a zwitterionic detergent is 3-(N,N-dimethyl - N - hexadecylammonio)-2-hydroxypropane-1-sulfonate. An example of an ampholytic detergent is sodium 3-dodecylaminopropionate. An example of a cationic detergent is cetyltrimethylammonium bromide.

The detergent compositions of this invention containing the novel gamma hydroxy sulfoxide detergents are excellent compositions for all types of cleaning operations. They are superior compositions for use in cleaning hard surfaces, textiles, etc., as hereinbefore and hereinafter described in detail.

The detergent compositions of this invention can be used for laundering fabrics in water having a temperature of from about 60° F. to about 212° F. The detergent compositions of this invention are particularly advantageous, i.e. water having a temperature of from about 60° F. to about 90° F. as hereinafter shown in Examples IX–XI. Preferably the step of washing is followed by rinsing and drying the fabrics. The detergent product concentration in solution can range from about .05% to about .5% by total weight and should be added in sufficient amount to provide a gamma hydroxy sulfoxide detergent concentration of at least 0.005%. The fabrics can be added to the container or washer either before or after the washing solution is added. As is usual in a washing step, the fabrics are then agitated in the detergent solution for varied periods of time but sufficient to obtain the desired amount of cleaning. With an automatic agitator type washer, it has been found that good cleaning can be achieved using a washing cycle which ranges from 8 to 15 minutes.

After the desired level of cleaning is achieved in the washing step, the washing liquor is then drained off or the fabrics are separated from the liquor and thereafter the fabrics are rinsed in substantially pure water. The fabrics can be rinsed as many times as desirable in order to insure that all of the washing liquor and other undissolved material is separated from them. Using an automatic washer, it has been found that six spray rinses and one deep rinse is usually sufficient for this purpose. Between and after rinsing steps, the bulk of the rinse water is usually drawn from, or spun out of the fabrics. After rinsing the fabrics can be dried by conventional means, using a machined dryer or simply hanging them on a line. Although rinsing and drying are usual and desirable steps, the important advantage of the invention is achieved in the washing step.

Normally the organic detergent components, the builders and the minor ingredients are incorporated into the composition prior to conversion into final product form, e.g., detergent granules, flakes, etc., but they can also be added individually in the form of particles or as liquids.

All percentages, ratios and parts herein are by weight unless otherwise specified.

The practice of the present invention is set forth in the following examples.

*Example I*

79 g. of dodecene-1-oxide (0.41 mole) was added dropwise over a two-hour period to a solution of 0.54 mole methylsulfinylcarbanion (sodium salt) in 250 ml. of dimethyl sulfoxide at room temperature and the mixture was stirred for two hours, at which time the reaction was essentially complete. After the reaction mixture was allowed to stand overnight at room temperature, 100 ml. of water was added and the mixture was extracted several times with a total of one liter of ethyl acetate. The residue upon removal of solvent was recrystallized once from ethyl acetate and once from hexane to yield 72 g. (64%) of 3-hydroxytridecyl methyl sulfoxide (melting point: 64–71° C.). Successive recrystallization of a portion of the product from carbon tetrachloride, hexane, carbon tetrachloride, and hexane yielded what is believed to be the higher melting diastereoisomeric pair (melting point: 81–81.5° C.). The calculated analysis was C—64.1%; H—11.53%; and S—12.21%, and the actual analysis was C—64.1; H—11.2; and S—12.1. Infrared absorption bands were found at 3.05 (hydroxyl group), at 9.6–9.7 (sulfoxide group) and at 10.0–10.1 (probably hydrogen bonding between the hydroxyl group and the sulfoxide group).

The 3-hydroxytridecyl methyl sulfoxide is an excellent detergent surfactant, either by itself, or particularly in compositions as hereinbefore described.

When the above reaction was repeated using ethylene oxide, the product was 3-hydroxypropyl methyl sulfoxide in 51% yield. The 3-hydroxypropyl methyl sulfoxide can be used as an intermediate in the preparation of, for example, detergent compounds.

When dodecylsulfinylcarbanion is reacted with four moles of ethylene oxide per mole of carbanion and then hydrolyzed, the product has approximately the following average structure:

$$C_{12}H_{25}-SO-CH_2(CH_2CH_2O)_4H$$

This structure is a surface active agent.

*Example II*

24.2 g. (0.10 moles) of dodecyl glycidyl ether was added dropwise, with cooling and stirring, to a solution of 0.11 mole of methylsulfinylcarbanion (sodium salt) in 100 ml. of dimethyl sulfoxide at a temperature of about 40° C. and stirring was continued for two hours, at which time the reaction was essentially complete. The reaction mixture was allowed to stand overnight at room temperature and then poured into 250 ml. of water and this mixture was extracted three times with ethyl acetate. The ethyl acetate was evaporated and the product was recrystallized successively from hexane, ethyl acetate, and hexane to yield 21.2 g. of product (melting point: 54–555° C.) and the residue from the combined mother liquors was recrystallized to given an additional 6.6 g. (melting point: 49.5°–50.5° C.). The product was 3-hydroxy-4-dodecyloxybutyl methyl sulfoxide. Infrared analysis showed absorption bands at $3.0\mu$, $8.95\mu$, and $9.8\mu$ which are characteristic of the hydroxy group, the ether linkage, and the sulfoxide group respectively.

The 3-hydroxy-4-dodecyloxybutyl methyl sulfoxide is useful as a detergent surfactant.

When decyl glycidyl ether was used in the above reaction, a 49% yield of 3-hydroxy-4-decyloxybutyl methyl sulfoxide, M.P. 44.5–46.5° was obtained.

*Analysis.*—Calculated for $C_{15}H_{32}O_3S$: C—61.6; H—11.0; S—10.96. Found: C—60.9; H—10.7; S—10.8.

*Example III*

Tridecyl methyl sulfoxide (12.3 g.) in 100 ml. benzene was treated with 33 ml. of a 15% solution of butyllithium in hexane. The mixture was stirred for one hour and then 2.5 g. of ethylene oxide was bubbled into the solution. The reaction mixture was allowed to stand overnight and then 10 ml. of dilute hydrochloric acid was added to it. The benzene was evaporated, the residue was dissolved in ethyl acetate and the solution was washed with hydrochloric acid followed by a water wash. The solvent layer was dried over magnesium sulfate, the solvent was evaporated and the residue was recrystallized from hexane to yield 4.2 g. (28%) of tridecyl 3-hydroxypropyl sulfoxide, M.P. 73–74–5°.

*Analysis.*—Calculated for $C_{16}H_{34}O_2S$: C—66.2%; H—11.8%; S—11.0%. Found: C—66.2%; H—11.6%; S—11.1%.

*Example IV*

A solution of potassium methanesulfenate and potassium methylsulfinylcarbanion in dimethyl sulfoxide/tetrahydrofuran solution was prepared from 3.9 g. of potassium, 50 ml. of dimethyl sulfoxide and 100 ml. of tetrahydrofuran. Then 6.8 g. of t-butyl bromide was added and after five minutes 9.2 g. of dodecene oxide was added. The mixture was stirred for about three hours, was poured into water, was extracted with ethyl acetate, was dried over magnesium sulfate, and the solvent was evaporated. The residue was recrystallized from hexane to yield 4.6 g. of 2-hydroxydodecyl methyl sulfoxide, M.P. 75–70°. The structure of the product was established by nuclear magnetic resonance atnd infrared absorption spectra.

When the above example is repeated without the treatment with t-butyl bromide to destroy the potassium methylsulfinylcarbanion, the product is a mixture of 3-hydroxytridecyl methyl sulfoxidet and 2-hydroxydodecyl methyl sulfoxide in a molar ratio of about 1:1.

When in the above examples the following groups are substituted for the methyl and/or tridecyl groups in the sodium and/or potassium salts of methylsulfinylcarbanion, methanesulfonate ion, and tridecylsulfinylcarbanion and/or when the following groups are substituted either wholly or in part for one and/or two hydrogen atoms on the carbanion so that the total number of carbon atoms in the resulting alkali metal sulfinyl carbanion compound is less than 32, and so that there are no more than two aromatic groups present in the molecule, substantially the same results are achieved in that the corresponding alkali metal sulfinyl carbanions react with the epoxy compounds to produce the corresponding hydroxy sulfoxide compounds: methyl; ethyl; n-propyl; isopropyl; n-butyl; isobutyl; n-pentyl; isopentyl; n-hexyl; n-heptyl; n-octyl; isooctyl; 2-ethylhexyl; diisobutyl; n-nonyl; tripropylene; n-decyl; undecyl; n-dodecyl; tridecyl; n-tetradecyl; pentadecyl; n-hexadecyl; n-octadecyl; eicosyl; docosyl; vinyl; propenyl; octenyl; 10-undecenyl; 9-octadecenyl; cyclopentyl; cyclohexyl; cyclohexylmethyl; methylcyclohexyl; 2-cyclohexyldodecyl; 12-cyclohexyldodecyl; 4-dodecylcyclohexyl; propynyl; phenyl; biphenyl; naphthyl; benzyl; 2-phenyl-dodecyl; 1-methyl-2-phenylethyl; 2-indenyl; naphthyl-methyl;

3,6,9,12,15-pentathiaheptacosanyl;
3,6,9,12,15-pentaoxaheptacosanyl;
3,6,9-trithiaheptacosanyl;
3,6,9-trioxaheptacosanyl;
2-dodecyloxyethyl;
2-octadecyloxyethyl;
2-methoxyethyl;
2-ethoxyethyl;
2-hexyloxyethyl;
2-octyloxyethyl;
2-dodecylthioethyl;
2-octadecylthioethyl;
2-methylthioethyl;
2-ethylthioethyl;
2-hexylthioethyl;
2-octylthioethyl;
11-methoxyundecyl;
11-methylthioundecyl;
11-ethoxyundecyl;
9- or 10-methoxyoctadecyl;
9- or 10-ethoxyoctadecyl;
9- or 10-methylthiooctadecyl;
2-, 3-, or 4-methoxycyclohexyl;
3- or 4-methylthiocyclohexyl;
3-cyclohexyloxydecyl;
2,5,8,11,14-pentamethyl-3,6,9,12,15-pentaoxaheneicosanyl;
2-tetrahydrofuranyl;
2-tetrahydrothiophenyl;
tetrahydropyranyl;
2-(tetrahydropyranyl)-ethyl;
2-(2-tetrahydrofuranyl)-ethyl;
tetrahydrothiofuranyl;
3,6-dioxaheptyl;
3,6-dithiaheptyl;
3,6,9-triazaheneicosanyl;
β-aminoethyl;

β-aminopropyl;
β-methylaminoethyl;
β-methylaminopropyl;
β-dimethylaminoethyl;
β-dimethylaminopropyl;
5-amino-3-azapentyl;
5-dimethylamino-3-azapentyl;
5-dimethylamino-3-methazapentyl;
8-amino-3,6-diazaoctyl;
15-amino-3,6,9,12-tetrazapentadecyl;
4,6-dimethoxy-2-sym-triazinyl;
4,6-diamino-2-sym-triazinyl;
4-piperidyl;
β-(N-piperidyl)-ethyl;
β-(N-piperazinyl)-ethyl;
β-(N-imidaxolyl)-ethyl;
β-(N-morpholino)-ethyl;
β-(N-oxazolyl)-ethyl;
β-(N-pyrrolidyl)-ethyl;
2-thiazolyl;
β-(N-anilino)-ethyl;
β-N-anilinopropyl;
β-N-pyridylethyl;
1-methoxy-2-indanyl;
β-N-naphthylaminoethyl;
2-benzoxazolyl;
4,6-dianilino-2-sym-triazinyl;
and mixtures thereof.

When in the above examples the corresponding potassium and lithium salts of the carbanions are substituted either wholly or in part for the sodium salts, substantially the same results are achieved in that the reaction with the epoxy compounds follows essentially the same path.

When in the above examples the following epoxy compounds are substituted either wholly or in part for the ethylene oxide or dodecene-1-oxide or the dodecyl glycidyl ether, substantially the same results are achieved in that the corresponding alkoxides and hydroxy sulfoxides are produced: dodecylene oxide; ethylene oxide; propylene oxide; octyl, decyl, dodecyl, tetradecyl, hexadecyl and octadecyl glycidyl ethers; hexadecylene oxide; octadecylene oxide; butylene oxides; butadiene diepoxide; styrene oxide; cyclohexene oxide; p-methyl styrene oxide; or mixtures of two or more of these epoxides.

When in the above examples the following solvents are substituted either wholly or in part for the dimethyl sulfoxide, substantially equivalent results are obtained in that the same reactions occur: benzene, 1,2-dimethoxy ethane, hexane, petroleum ether, xylenes, diphenyl ether, tetrahydrofuran, butylamine, N,N-dimethyl formamide, or diethylene glycol dimethyl ether (diglyme), "Stoddard" solvent, toluene, pyridine, diethyl ether, dibutyl ether, anisole, N-methyl butylamine, anhydrous ethylene diamine, morpholine, anhydrous liquid ammonia, and mixtures thereof.

*Examples V–VIII*

In the following examples the detergency effectiveness of the detergent surfactants of this invention was determined by washing naturally soiled swatches of desized print cloth for ten minutes in an aqueous solution of the detergent to be evaluated under the following conditions:

(1) Water temperature—130° F.
(2) Water hardness—7 gr.
(3) Detergent surfactant concentration—0.02% by weight.
(4) Sodium tripolyphosphate builder concentration—0.05% by weight.
(5) Water pH—10.

A miniature machine (the Tergotometer) having normal reciprocating agitation was used. (Tergotometer testing is described in "Detergency Evaluation and Testing," by J. C. Harris, Interscience Publishers, Inc., 1954, p. 60.)

After washing, rinsing and drying, the amount of lipid soil remaining on the swatch was determined by extraction with organic solvent. By comparison with similar determinations of the amount of lipid soil in similarly soiled swatches washed under the same conditions with sodium tallow alkyl sulfate the relative effectiveness of the detergent surfactant can be determined. The results given are in percent by weight of lipid soil removed from the cloth by the organic solvent, either more or less than that amount removed by the organic solvent from cloth cleaned in the sodium tallow alkyl sulfate. Therefore, negative numbers represent better cleaning than the reference surfactant and positive numbers represent poorer cleaning than the reference surfactant. Sodium tetrapropylene benzene sulfonate, a standard commercial detergent surfactant, is included to show the effectiveness of the compounds of the invention relative to commercial products.

The results of the tests are summarized below:

| Example | Detergent Surfactant | Test Result |
| --- | --- | --- |
| V | 3-hydroxytridecyl methyl sulfoxide | −13 |
| VI | 3-hydroxypentadecyl methyl sulfoxide | +14 |
| VII | 3-hydroxy-4-dodecyloxybutyl methyl sulfoxide | +14 |
| VIII | ----do---- | +3 |
|  | Sodium tetrapropylene benzene sulfonate | +30 |

The detergent surfactant of Example V is an exceptionally efficient detergent. The detergent surfactants of Examples VI, VII and VIII are very good detergent materials and are substantially better than the standard commercial surfactant.

*Examples IX–XI*

The detergency of the following compositions was evaluated by washing naturally soiled white dress shirts. Shirts are worn by male subjects under ordinary conditions for two normal working days. The degree to which the detergent composition containing a detergent compound to be tested cleans the collars and cuffs of the soiled shirts relative to the cleaning degree of a similar composition containing a standard detergent compound is considered a measure of detergency effectiveness of the test compound.

The washing solution used in the test contains 0.03% organic surface active agent and 0.06% sodium tripolyphosphate. No fluorescers, bleaches or anti-redeposition agents were used. The pH of the washing solution is 10 and water of 7 grains per gallon hardness is used. A conventional agitator type washer is used.

The relative cleaning effectiveness of each cleaning detergent composition was then translated onto a 1–10 scale wherein on the scale 1 is filthy, 5 is acceptable and 10 is clean with the remaining numbers representing intermediate values of these conditions.

| Example | Detergent Surfactant | Temp., °F. | Cleaning Grades |
| --- | --- | --- | --- |
| IX | 3-hydroxytridecyl methyl sulfoxide. | 80 | 7.1 |
| X | 4-decoxy-3-hydroxy butyl methyl sulfoxide. | 80 | 8.1 |
| XI | 4-dodecoxy-3-hydroxy butyl methyl sulfoxide. | 80 | 6.7 |
|  | Sodium tetrapropylene benzene sulfonate. | 140 | 5.0 |

As can be seen from the above data, the detergent surfactant of Examples IX–XI are very good detergents at 80° F. In fact, they give better results when used at 80° F. than the standard detergent when it is used at 140° F.

When in the above examples pyrophosphates; ethylene diaminetetracetates; N-(2-hydroxyethyl)-ethylenediamine triacetates; nitrilo triacetates; N-(2-hydroxyethyl)-nitrilo-diacetates; phytates; ethane-1-hydroxy - 1,1 - diphosphonates; methylenediphosphonate; ethylidene diphosphonates; isopropylidene diphosphonates; benzylmethylidene diphosphonates; chloromethylidene diphosphonates; salts of polymers of itaconic acid, aconitic acid, maleic acid, mesaconic acid, fumaric acid, methylene maleic acid and citraconic acid; salts of copolymers of the above acids with themselves; salts of copolymers of the above acids with ethylene; salts of copolymers of the above acids with themselves and ethylene (the foregoing named polymers and copolymers have molecular weights of at least 350 and equivalent weights of from 50 to 80 based on the acid forms); and mixtures thereof in the form of their sodium, potassium, triethanolammonium, diethanolammonium, and monoethanolammonium salts and mixtures thereof are substituted, either wholly or in part, e.g., a 50% substitution, for the sodium tripolyphosphate builders substantially equivalent results are obtained in that for each builder substitution the detergent agents used in the process of this invention are effective cleaning agents at conventional temperatures and at cool water temperatures of about 80° F. and the above detergency building agents provide their building function with such detergent agents. The surprising cool water superiority of these combinations of these detergent agents and builders is found on a relative basis throughout the cool water range from about 60° F.–90° F.

*Example XII*

The following sulfoxide detergent materials were tested for mildness in the following manner. Guinea pigs were immersed in solutions of the detergent materials and the skins of the guinea pigs were graded on a scale of from 1–10, wherein 10 represents no effect and 1 represents a very harsh effect. The results were as follows:

Compound: Average grade
  4-decoxy-3-hydroxy butyl methyl sulfoxide ___ 7.0
  4-octoxy-3-hydroxy butyl methyl sulfoxide __ 10.0
  3-hydroxy-undecyl methyl sulfoxide _____ 8.0
  3-hydroxy pentadecyl methyl sulfoxide _____ 9.6
  3-hydroxy tridecyl methyl sulfoxide _____ 8.3
  Sodium tetrapropylene benzene sulfonate __ About 3

As can be seen from the above data, the detergent materials of this invention are especially mild as well as effective.

*Example XIII*

Compositions were prepared containing 0%, 10%, 15% and 20% of (A) 3-hydroxytridecyl methyl sulfoxide and (B) 3-hydroxy-4-dodecoxybutyl methyl sulfoxide and the balance essentially sodium soap of fatty acids derived from tallow (80%) and coconut oil (20%). These compositions were prepared in the form of toilet bars.

These compositions were tested for curd formation and bathtub ring formation. First, the bars were rubbed with the experimenter's hands for about 10 seconds and the hands were rubbed together for about 20 seconds to build up the lather. The hands were then rinsed in one gallon of water having a hardness of 14 grains and a temperature of about 100° F. in a dark dishpan having small tiles affixed which were partially immersed in the water. This procedure was then repeated and after a few minutes the water was observed to determine the amount of curd present and after gentle agitation the water was removed from the pan and the amount of deposit on the tiles was observed. The amount of curd visible in the water and the amount of deposit on the tiles when the pure soap was used was assigned the grade of 3. Higher grades represent less curd and deposit (ring). The results of the testing of the above compositions were as follows:

| Sulfoxide | | A | A | A | B | B | B |
|---|---|---|---|---|---|---|---|
| Percentage of Sulfoxide | 0 | 10 | 15 | 20 | 10 | 15 | 20 |
| Curd/Ring Grades | 3/3 | 3½/4½ | 6/6 | 7½/7 | 3/4 | 5½/6 | 7/7 |

Compositions containing soap and the sulfoxide compounds of this invention were clearly superior in curd formation and bathtub ring properties to compositions containing soap alone. This shows that the sulfoxide compounds of this invention clearly have excellent curd dispersing qualities.

*Example XIV*

The hard surface cleaning performance of $$C_{10}H_{21}OCH_2CHOHCH_2CH_2SOCH_3$$

was evaluated with both artifically and naturally soiled linoleum and tile test panels using a Gardner-Straightline Washability Machine. This sulfoxide was compared with coconut diethanolamide in model formulations which consisted of 5% surfactant, 12% tetrapotassium pyrophosphate, 9% potassium toluenesulfonate and 74% water. The model formulation was then used as a 1.5% solution in water. In this test, the sulfoxide cleaned significantly better than the coconut diethanolamide which in turn cleans significantly better than sodium tetrapropylene benzene sulfonate which is the standard.

*Example XV*

The following are typical detergent compositions of this invention.

Solid

| | Percent |
|---|---|
| 3-hydroxytridecyl methyl sulfoxide | 7 |
| Sodium tripolyphosphate | 50 |
| Sodium xylene sulfonate | 5 |
| Sodium silicate ($Na_2O:SiO_2=1:2.5$) | 7 |
| Fluorescent dye | .16 |
| Perfume | .2 |
| Benzotriazole | .02 |
| Sodium sulfate | 20.62 |
| Water and minor amounts of miscellaneous | 10 |

Liquid

| | |
|---|---|
| 3-hydroxyalkyl[1] methyl sulfoxide | 12 |
| Tetrapotassium pyrophosphate | 20 |
| Sodium silicate ($Na_2O:SiO_2=1:1.6$) | 3.8 |
| Potassium toluene sulfonate | 8.5 |
| Sodium carboxymethyl hydroxy ethyl cellulose | .3 |
| Fluorescent dye | .12 |
| Perfume | .15 |
| Benzotriazole | .02 |
| Water | 55.11 |

[1] Alkyl referring to the group derived from the middle cut of coconut fatty alcohol (2% $C_{10}$, 66% $C_{12}$, 23% $C_{14}$, 9% $C_{16}$).

Liquid

| | Percent |
|---|---|
| 4-decoxy-3-hydroxy butyl methyl sulfoxide | 22 |
| Tetrapotassium pyrophosphate | 19 |
| Sodium silicate ($Na_2O:SiO_2=1:1.6$) | 3.8 |
| Potassium toluene sulfonate | 8.5 |
| Sodium carboxy methyl hydroxy ethyl cellulose | .3 |
| Perfume | .2 |
| Benzotriazole | .02 |
| Water and minor amounts of miscellaneous | 43.18 |

Liquid

| | |
|---|---|
| 4-alkoxy[1] -3-hydroxy butyl methyl sulfoxide | 12 |
| Tetrapotassium pyrophosphonate | 19 |
| Sodium silicate ($Na_2O:SiO_2=1:1.6$) | 3.8 |
| Potassium toluene sulfonate | 8.5 |
| Sodium carboxy methyl cellulose | .3 |
| Perfume | .2 |
| Water | 56.20 |

[1] Alkoxy referring to the group obtained from tallow fatty alcohol (66% $C_{18}$, 30% $C_{16}$, 4% $C_{14}$ and others).

17

Solid

| | Percent |
|---|---|
| 3-hydroxyalkyl [1] methyl sulfoxide | 17 |
| Sodium tripolyphosphate | 50 |
| Sodium silicate (Na$_2$O:SiO$_2$=1:2.5) | 6 |
| Sodium toluene sulfonate | 2 |
| Sodium carboxy methyl cellulose | .3 |
| Sodium sulfate | 13 |
| Fluorescent dye | .16 |
| Water | 8 |
| Miscellaneous | Balance |

[1] Alkyl referring to the group obtained from tallow fatty alcohol (66% C$_{18}$, 30% C$_{16}$, 4% C$_{14}$ and others).

Solid

| | Percent |
|---|---|
| 4-alkoxy [1] -3-hydroxy butyl methyl sulfoxide | 10 |
| Sodium pyrophosphate | 60 |
| Sodium silicate (Na$_2$O:SiO$_2$=1:2.5) | 6 |
| Sodium toluene sulfonate | 2 |
| Sodium carboxy methyl cellulose | .3 |
| Water | 11.3 |
| Miscellaneous (fluorescers, perfume, anti-tarnish agents, sodium sulfate, etc. | Balance |

[1] Alkoxy referring to the group obtained from tallow fatty alcohol (66% C$_{18}$, 30% C$_{16}$, 4% C$_{14}$ and others).

Solid

| | Percent |
|---|---|
| 3-hydroxyalkyl [1] methyl sulfoxide | 35 |
| Sodium tripolyphosphate | 15 |
| Ethane-1-hydroxy-1,1-diphosphonate | 10 |
| Sodium nitrilo triacetate | 10 |
| Sodium silicate (Na$_2$O:SiO$_2$=1:2.5) | 6 |
| Sodium toluene sulfonate | 2 |
| Sodium carboxy methyl cellulose | .3 |
| Sodium sulfate | 10 |
| Water | 11 |
| Miscellaneous | Balance |

[1] Alkyl referring to the group derived from the middle cut of coconut fatty alcohol (2% C$_{10}$, 66% C$_{12}$, 23% C$_{14}$, 9% C$_{16}$).

Solid

| | Percent |
|---|---|
| 4-alkoxy [1] 3-hydroxy butyl methyl sulfoxide | 17 |
| Sodium tripolyphosphate | 45 |
| Sodium silicate (Na$_2$O:SiO$_2$=1:2.5) | 6 |
| Sodium carboxy methyl cellulose | .3 |
| Sodium sulfate | 28 |
| Water | 3.5 |
| Miscellaneous | Balance |

[1] Alkoxy referring to the group derived from the middle cut of coconut fatty alcohol (2% C$_{10}$, 66% C$_{12}$, 23% C$_{14}$, 9% C$_{16}$).

Liquid

| | Percent |
|---|---|
| 3-hydroxytridecyl methyl sulfoxide | 12 |
| Sodium nitrolo triacetate | 19 |
| Sodium silicate (Na$_2$O:SiO$_2$=1:1.6) | 3.8 |
| Sodium carboxy methyl cellulose | .3 |
| Water | 63 |
| Miscellaneous | Balance |

18

When in the above examples the builders named hereinbefore for substitution in Examples IX–XI are substituted in the above examples, substantially equivalent results are obtained in that the resulting detergent compositions are effective cleaning agents at conventional temperatures and at cool water temperatures at about 80° F., and the above detergency building agents provide their building function in such detergent compositions.

What is claimed is:

1. A detergent composition consisting essentially of from about 0.5% to about 90% of a material having the formula:

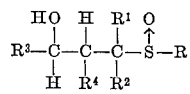

wherein at least one of the group R, R$^1$, R$^2$, R$^3$ and R$^4$ is an alkyl or alkoxyalkyl group containing from about 8 to about 18 carbon atoms and wherein the alkoxyalkyl group contains from 1 to about 10 ether linkages, the remaining groups being selected from the group consisting of hydrogen and alkyl groups containing from 1 to about 18 carbon atoms, the total number of carbon atoms in the molecule being from about 12 to about 32 carbon atoms, and from about 10% to about 90% of water soluble alkaline detergency builder salts, the ratio of builder salts to organic detergents being from about 1:4 to about 20:1.

2. The process for laundering fabrics in cool water comprising the step of washing said fabrics in water having a temperature of from about 60° F. to about 90° F. and containing from about .05% to 0.5% of the detergent composition of claim 1.

3. The detergent composition of claim 1 wherein R is a methyl group, R$^1$, R$^2$ and R$^4$ are hydrogen atoms, and wherein R$^3$ is a straight chain aliphatic hydrocarbon group containing from about 6 to about 18 carbon atoms.

4. The detergent composition of claim 3 wherein R$^3$ has the formula

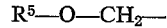

wherein R$^5$ is a straight chain aliphatic hydrocarbon group containing from about 6 to about 18 carbon atoms.

References Cited

UNITED STATES PATENTS

| 2,990,375 | 6/1961 | Steinhauer et al. | 252—138 |
| 3,005,852 | 10/1961 | Freyermuth et al. | 260—207 |
| 3,045,051 | 7/1962 | Coma et al. | 260—607 |
| 3,124,618 | 3/1964 | Berry | 260—607 |
| 3,144,412 | 8/1964 | Inamorato | 252—138 |

OTHER REFERENCES

Neller: "Chemistry of Organic Compounds," 2nd ed., 1957, p. 100, Q.D. 253 N 65.

LEON D. ROSDOL, *Primary Examiner.*

S. E. DARDEN, *Examiner.*